United States Patent [19]

Cawlfield et al.

[11] Patent Number: 5,322,598
[45] Date of Patent: Jun. 21, 1994

[54] CHLORINE DIOXIDE GENERATION USING INERT LOAD OF SODIUM PERCHLORATE

[75] Inventors: David W. Cawlfield; Jerry J. Kaczur, both of Cleveland, Tenn.

[73] Assignee: Olin Corporation, Stamford, Conn.

[21] Appl. No.: 43,057

[22] Filed: Apr. 5, 1993

Related U.S. Application Data

[63] Continuation-in-part of Ser. No. 919,697, Jul. 24, 1992, Pat. No. 5,264,089, which is a continuation-in-part of Ser. No. 786,155, Oct. 31, 1991, Pat. No. 5,258,105, which is a continuation-in-part of Ser. No. 475,603, Feb. 6, 1990, Pat. No. 5,084,148.

[51] Int. Cl.$^5$ .............................................. C25B 1/26
[52] U.S. Cl. ..................................... 204/95; 204/101; 204/103; 423/478
[58] Field of Search .................... 204/95, 101, 103; 423/477, 478

[56] References Cited

U.S. PATENT DOCUMENTS

| | | | |
|---|---|---|---|
| 2,332,181 | 10/1943 | Soule | 23/152 |
| 2,811,420 | 10/1957 | Pernert | 23/152 |
| 2,833,624 | 5/1958 | Sprauer | 23/152 |
| 3,594,580 | 7/1971 | Westerlund | 252/187 |
| 3,607,027 | 9/1971 | Westerlund | 23/152 |
| 3,810,969 | 5/1974 | Schlumberger | 423/478 |
| 3,823,225 | 7/1974 | Sprague | 423/478 |
| 3,852,033 | 12/1974 | Hultman | 23/230 |
| 3,864,456 | 2/1975 | Winfield et al. | 423/478 |
| 4,081,520 | 3/1978 | Swindells et al. | 423/478 |
| 4,086,328 | 4/1978 | Swindells | 423/478 |
| 4,180,815 | 12/1979 | Hill | 343/6.5 R |
| 4,426,263 | 1/1984 | Hardee et al. | 204/101 |
| 4,454,012 | 6/1984 | Bachot et al. | 204/72 |
| 4,465,658 | 8/1984 | Fredette | 423/478 |
| 4,470,888 | 9/1984 | Wheaton | 204/95 |
| 4,473,540 | 9/1984 | Fredette | 423/479 |
| 4,627,969 | 12/1986 | Fredette | 423/478 |
| 4,673,454 | 6/1987 | Liu et al. | 156/281 |
| 4,767,510 | 8/1988 | Lipsztajn | 204/101 |
| 4,798,715 | 1/1989 | Hardee et al. | 423/478 |
| 4,806,215 | 2/1989 | Twardowski | 204/98 |
| 4,915,927 | 4/1990 | Lipsztajn et al. | 423/472 |
| 4,938,943 | 7/1990 | Norell | 423/478 |
| 4,961,918 | 10/1990 | Norell et al. | 423/479 |
| 4,978,517 | 12/1990 | Norell et al. | 423/479 |
| 4,986,973 | 1/1991 | Svedin et al. | 423/479 |
| 5,002,746 | 3/1991 | Norell | 423/479 |
| 5,028,408 | 7/1991 | Duncan et al. | 423/497 |
| 5,037,627 | 8/1991 | Melton et al. | 423/473 |
| 5,041,196 | 8/1991 | Cawlfield et al. | 204/101 |
| 5,055,285 | 10/1991 | Duncan et al. | 423/473 |
| 5,064,514 | 11/1991 | Cawlfield et al. | 204/103 |
| 5,084,148 | 1/1992 | Kaczur et al. | 204/95 |
| 5,084,149 | 1/1992 | Kaczur et al. | 204/101 |
| 5,089,095 | 2/1992 | Cawlfield et al. | 204/101 |
| 5,091,165 | 2/1992 | Shaffer et al. | 423/474 |
| 5,091,166 | 2/1992 | Engstrom et al. | 423/478 |
| 5,091,167 | 2/1992 | Engstrom et al. | 423/478 |
| 5,092,970 | 3/1992 | Kaczur et al. | 204/98 |
| 5,093,097 | 3/1992 | Engstrom et al. | 423/479 |
| 5,098,689 | 3/1992 | Bridges | 423/474 |
| 5,102,648 | 4/1992 | Duncan et al. | 423/473 |
| 5,106,465 | 4/1992 | Kaczur et al. | 204/98 |
| 5,106,591 | 4/1992 | Hilliard et al. | 422/232 |
| 5,108,560 | 4/1992 | Cawlfield et al. | 204/103 |
| 5,112,521 | 5/1992 | Mullins et al. | 252/180 |
| 5,116,594 | 5/1992 | Hilliard et al. | 423/473 |
| 5,118,426 | 6/1992 | Duncan et al. | 210/721 |
| 5,120,452 | 6/1992 | Ness et al. | 210/754 |
| 5,131,989 | 7/1992 | Dotson et al. | 204/82 |
| 5,174,868 | 12/1992 | Lipsztajn et al. | 204/95 |
| 5,242,554 | 9/1993 | Kaczur et al. | 204/95 |
| 5,248,397 | 9/1993 | Cawlfield et al. | 204/95 |

FOREIGN PATENT DOCUMENTS

| | | |
|---|---|---|
| 2-157103 | 2/1990 | Japan . |
| 2-160606 | 2/1990 | Japan . |
| 4-289288 | 2/1992 | Japan . |
| 4-228690 | 4/1992 | Japan . |
| 4-263687 | 4/1992 | Japan . |

OTHER PUBLICATIONS

"Ozone Bleaching in the Medium Consistency Range—Experience in a Large Industrial Plant", Paper presented at Austrian Paper Conference, May 14, 1991, Graz, Austria.

Primary Examiner—Donald R. Valentine
Assistant Examiner—Patrick J. Igoe
Attorney, Agent, or Firm—William A. Simons

[57] ABSTRACT

A process for producing chlorine dioxide a solution of chloric acid is reduced in the presence of an externally added load of perchlorate ions to form chlorine dioxide.

18 Claims, 4 Drawing Sheets

CHLORINE DIOXIDE GENERATION USING INERT LOAD OF SODIUM PERCHLORATE

This application is a continuation-in-part application of U.S. Ser. No. 07/919,697 filed Jul. 24, 1992, now U.S. Pat. No. 5,264,089 issued Nov. 23, 1993 which is a continuation-in-part application of U.S. Ser. No. 07/786,155 filed Oct. 31, 1991 now U.S. Pat. No. 5,258,105 issued Nov. 2, 1993 which is a continuation-in-part application of Ser. No. 07/475,603 filed Feb. 6, 1990 now U.S. Pat. No. 5,084,148 issued Jan. 28, 1992.

FIELD OF THE INVENTION

This invention relates to a process of producing chlorine dioxide gas from the reduction of chloric acid and alkali metal chlorate solutions in the presence of an externally added inert load of perchlorate ions.

BACKGROUND OF THE INVENTION

Chlorine dioxide is widely used as a disinfectant in water treatment/purification and as a bleaching agent in pulp and paper production. There are a variety of chlorine dioxide generator systems and processes available in the marketplace. Most of the large scale generators produce chlorine dioxide by reacting a chlorate ion with hydrogen ions and an electron. This reaction can be represented by:

$$ClO_3^- + 2H^+ + e^- \rightarrow ClO_2 + H_2O$$

These generators use sodium chlorate and/or chloric acid to provide the chlorate ions. Hydrogen ions are supplied by sulphuric or hydrochloric acid. The electron can be provided by a reducing agent such as methanol, sulphur dioxide or sodium chloride.

Unfortunately a problem exists in that these generators produce undesirable by-product salts such as sodium sulfate ("salt cake"), sodium bisulfate and/or sodium chloride. U.S. Pat. No. 4,081,520 discloses a process of producing chlorine dioxide in which sulfuric acid is reacted with sodium chlorate and methanol. Sodium ions from dissociated sodium chlorate react with sulfate ions from sulfuric acid to form by-product sodium sulfate. For every mole of sodium chlorate that reacts with a mole of sulphuric acid, one mole of sodium sulfate is produced. As the concentration of sodium sulfate rises it begins to precipitate out of solution and must be removed. The removal of sodium sulfate or other commonly formed salts represents an additional expense in the production of chlorine dioxide. Increasing the production of chlorine dioxide generally means increased capital investment to process the additional amounts of by-product salt produced.

U.S. Pat. No. 3,563,702 describes a process for Producing chlorine dioxide where an alkali metal chlorate, an alkali metal chloride and a strong acid are reacted in the presence of a catalyst. This reaction produces an effluent containing sodium sulfate which must be removed from the reaction.

U.S. Pat. No. 4,486,399 to Lobley recognizes the Problem of by-product salt formation in chlorine dioxide generators. Lobley discloses a method of producing chlorine dioxide that uses minimal amounts of sulfuric acid and feeds sodium chlorate to the generator as a solid. In this manner sulfate salt content in effluent from the generator can be reduced.

Another process of producing chlorine dioxide is disclosed by Schlumberger in U.S. Pat. No. 3,810,969 which teaches a method of making chlorine dioxide from a solution of chloric acid. Chloric acid is made by passing alkali metal chlorate through a cation exchange resin. The resulting chloric acid is reduced using hydrochloric acid in the presence of a catalyst. Sodium bisulfate and sodium sulfate are produced as by products requiring disposal in this reaction.

A process reducing the amount of by-product salt is therefore commercially desirable. In an effort to reduce the expense of removing and disposing of undesirable salts in the effluent of chlorine dioxide generators, new processes have been developed which reduce the quantity of by-product salts. U.S. Pat. No. 4,798,715 to Hardee et al discloses a process of producing chlorine dioxide in an electrochemical cell which reduces the salt content of effluent from the chlorine dioxide generator.

Twardowski, U.S. Pat. No. 4,806,215 discloses a chlorine dioxide generating system in which effluent containing sodium chloride from the chlorine dioxide generator is recycled though an electrochemical cell to produce hydrochloric acid and sodium hydroxide. The hydrochloric acid can then be reused in the generator to make chlorine dioxide.

Lipstajn et al discloses a means of making chlorine dioxide whereby sulfate salts are not formed. In WO 92/03374 Lipstajn teaches the reduction of chloric acid in the substantial absence of sulfate ions to make chlorine dioxide.

While methods are known to make chlorine dioxide with reduced levels of salts in the resulting effluent, such processes are often limited by the efficiency of the electrochemical cells used in such processes. In these processes the source of chlorate ions is often sodium chlorate. In the electrolytic formation of chloric acid from sodium chlorate, the electrochemical current efficiency is determined by the ratio of sodium to hydrogen ions entering and leaving the first ion exchange compartment in a three compartment cell, or the anode compartment in the case of a two compartment cell. Hydrogen ion transport into the cathode compartment is a cause of the current inefficiency in electrochemical processes using cells in the Prior art.

Thus two problems exist. First the production of by-product sulfate salts in effluent from a generation reaction and second, the efficiency of the electrochemical acidification reaction. As a result of these problems there exists a need for a process of producing chlorine dioxide which does not produce undesirable salts and which operates at a high efficiency.

SUMMARY OF THE INVENTION

Now a process has been discovered which permits the production of chlorine dioxide without production of undesirable by-product salts. Further, the novel process herein disclosed is an efficient process that uses less energy than other processes. In addition, a reduction of process steps and process equipment required for the production of chlorine dioxide is achieved using the claimed invention. The claimed process permits variability in the composition of a chlorate solution used in chlorine dioxide generators. Further, the process permits a reduction in the amount of acid required and subsequently the amount of salt by-product produced in the chlorine dioxide generator. Still further, the process allows for the production of an alkali metal hydroxide as a valuable by-product or acidic solutions of alkali metal salts at reduced energy costs.

These and other advantages are accomplished generally by a process which comprises reducing a solution of chloric acid and sodium chlorate in the presence of an externally added load of perchlorate ions to form chlorine dioxide. Further, according to the invention, a solution of chloric acid and alkali metal chlorate is fed into a reaction zone containing an externally added load of perchlorate ions and the chloric acid in the solution is reduced to form chlorine dioxide. The effluent resulting from this reduction step is then fed to an electrolysis zone where alkali metal chlorate is electrolyzed to form chloric acid. Finally, the electrolyzed solution of alkali metal chlorate and chloric acid is recycled to the reaction zone for further chlorine dioxide production.

BRIEF DESCRIPTION OF THE DRAWINGS

The novel process of the present invention and its application in producing chlorine dioxide can be carried out in an apparatus illustrated in the drawings wherein.

DETAILED DESCRIPTION OF THE DRAWINGS

Figure 1:
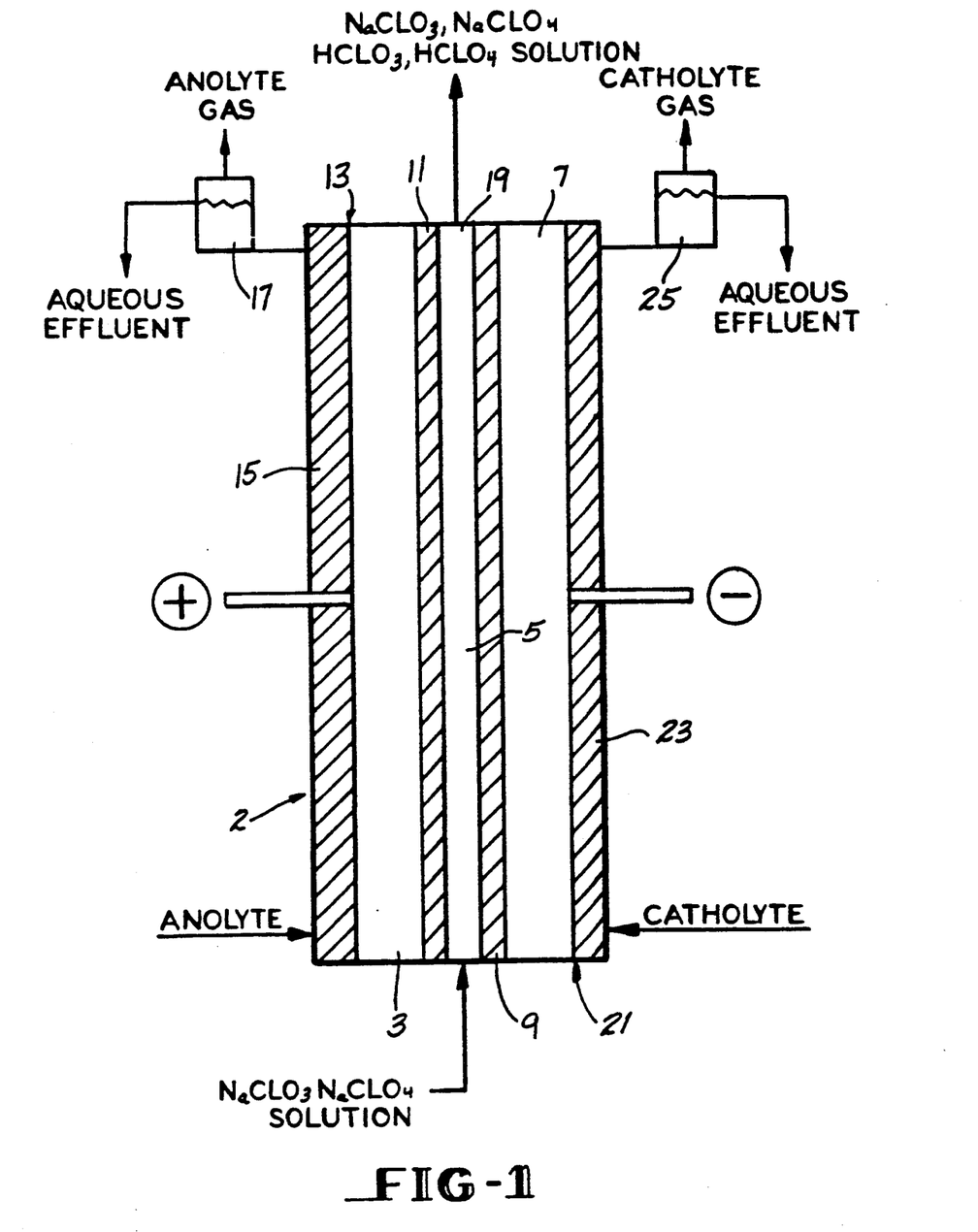
FIG. 1 is a sectional side elevational view of an electrolytic cell which can be employed in the novel process of the invention.

FIG. 1 shows an electrolytic cell 2 which is used to electrolyze a solution of alkali metal chlorate and sodium perchlorate to form a mixed solution containing among other compounds chloric acid and perchloric acid divided into anode compartment 3, ion exchange compartment 5, and cathode compartment 7 by cation permeable ion exchange membranes 9 and 11. Anode compartment 3 includes anode 13, and anode spacer 15. Anode spacer 15 positions porous anode 13 with respect to cation permeable ion exchange membrane 11 and aids in the disengagement of anolyte gas produced. Anolyte disengager 17 completes the disengagement of anolyte gas from the spent anolyte solution. Ion exchange compartment 5 includes spacer material 19 which provides a flow channel between cation permeable ion exchange membranes 9 and 11 for the aqueous alkali metal chlorate solution. Cathode compartment 7 includes cathode 21, and cathode spacer 23. Cathode spacer 23 positions cathode 21 with respect to cation permeable ion exchange membrane 9 and aids in the disengagement of catholyte gas produced. The disengagement of catholyte gas from the spent catholyte solution is accomplished in cathode disengager 25.

Figure 2:
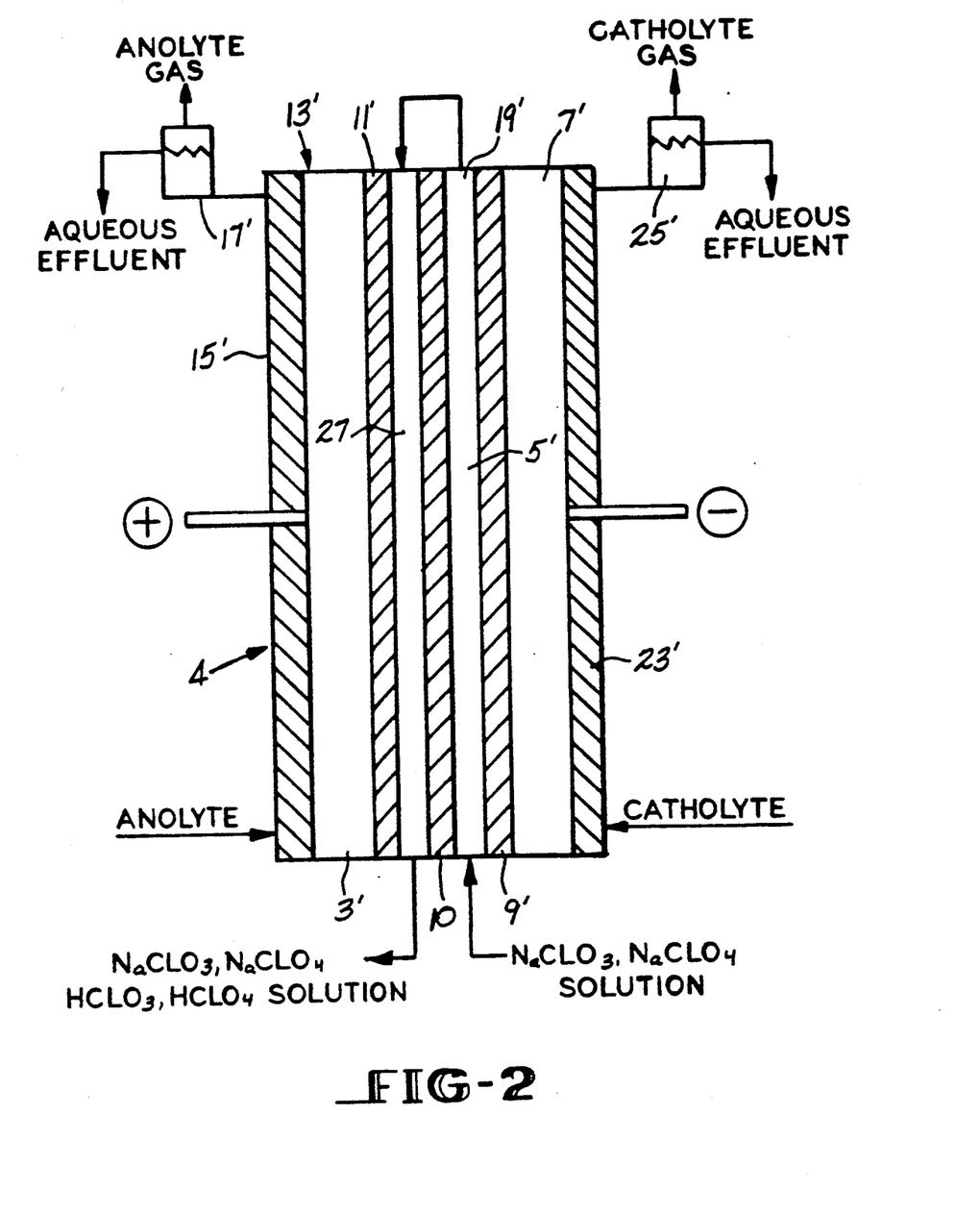
FIG. 2 is a sectional side elevational view of an alternative electrolytic cell which can be employed in the novel process of the invention.

In FIG. 2, electrolytic cell 4 has been expanded to include a second ion exchange compartment 27 which is positioned between anode compartment 3' and ion exchange compartment 5'. Cation permeable ion exchange membrane 11' separates anode compartment 3' from ion exchange compartment 27. The sodium chlorate/sodium perchlorate feed solution enters the lower part of ion exchange compartment 5', flows upward and out of ion exchange compartment 5' into the upper part of ion exchange compartment 27. The $HClO_3$/$HClO_4$/$NaClO_3$/$NaClO_4$ product solution is recovered from the lower part of ion exchange compartment 27.

The flow direction in the ion exchange compartments can also be reversed, for example, with the solution from the top of ion exchange compartment 27 being fed to the bottom of ion exchange compartment 5'. The product solution then exits from the top of ion exchange compartment 5'.

Figure 3:
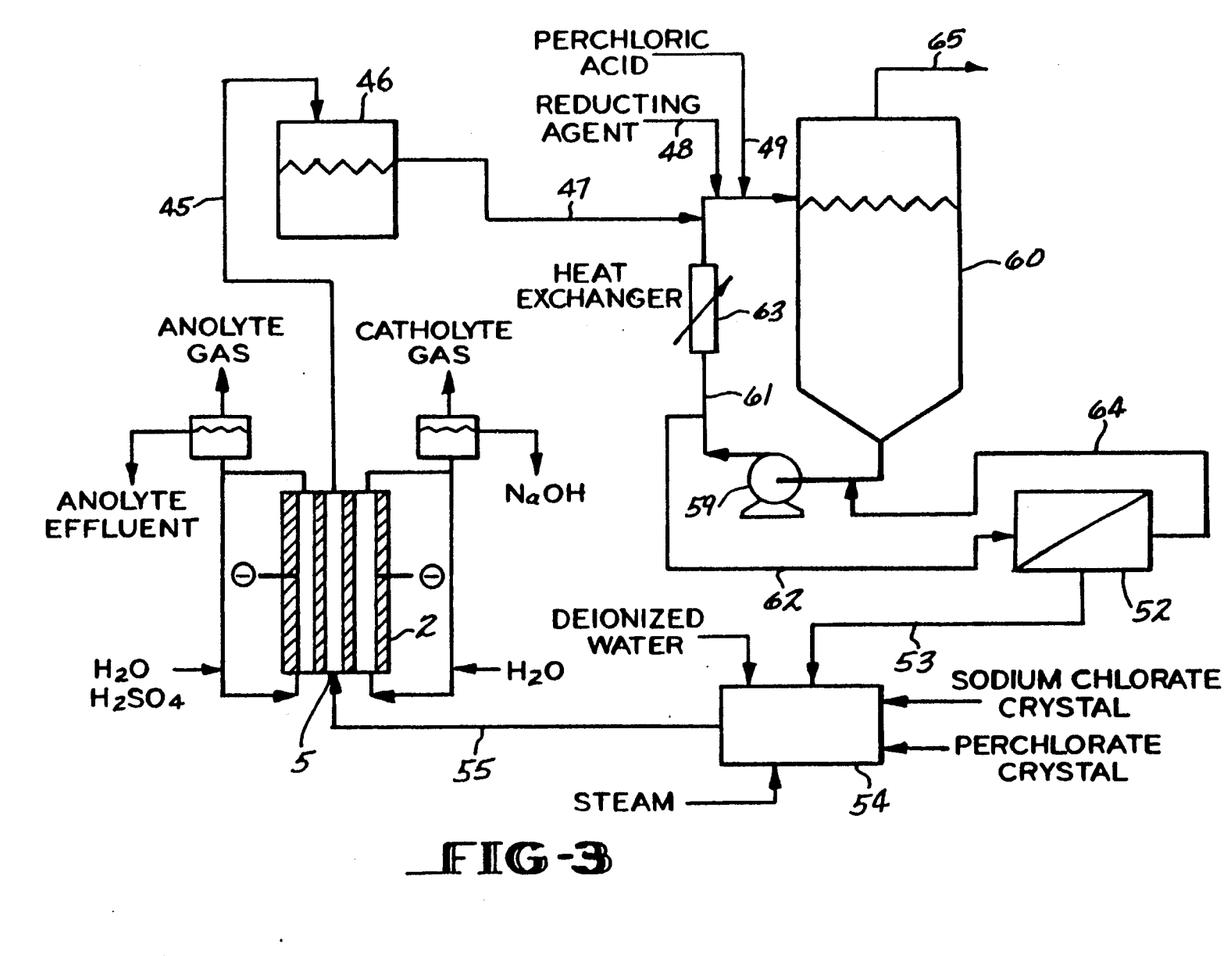
FIG. 3 is a diagrammatic illustration of a system which can be employed in the process of the invention.

In the continuous process depicted in FIG. 3, the chloric acid - alkali metal chlorate solution from ion exchange compartment 5 of electrolytic cell 2 is fed to solution surge or storage tank 46 by line 45. The use of the surge tank 46 is preferred, but not required for Process operation. The surge tank isolates electrolytic cell 2 from liquid column and sub-atmospheric or super-atmospheric process pressures used to operate chlorine dioxide generator 60. The chloric acid - alkali metal chlorate solution from surge tank 46 then enters into the chlorine dioxide generator 60 aqueous solution circulation recycle loop through line 47.

The chlorine dioxide generator system consists of chlorine dioxide generator vessel 60 with circulation pump 59 pumping a slurry or solution of aqueous chloric acid, alkali metal chlorate, sodium perchlorate and precipitated alkali metal chlorate containing small amounts of residual reducing agent and its reaction byproducts around the flow loop. The pump output flows through line 61 into a heat exchanger 63 and back into generator 60. Heat exchanger 63 supplies the heat requirement for the removal of water vapor by evaporation that exits with the chlorine dioxide product from generator 60 through line 65. Reducing agent is added through line 48 into chlorine dioxide generator 60. Perchloric acid may be added to the generator 60 by separate feed 49. The chlorine dioxide product, water vapor and reducing agent byproduct gases exit from generator 60 by line 65 preferably under sub-atmospheric pressure.

A portion of the generator slurry flow from pump 59 is routed to separator 52 by line 62 to separate the alkali metal chlorate/perchlorate precipitate from the aqueous chloric acid, perchloric acid and alkali metal chlorate/perchlorate solution phase. There are a number of suitable types of separators that can be employed such as centrifuges, belt filters, and the like. The aqueous phase solution from separator 52 is then recycled back into generator 60 circulation loop by line 64. The separated alkali metal chlorate/perchlorate precipitate from separator 52, which can be in the form of small crystals, or more preferably large crystals, can be washed with deionized water or more preferably with a concentrated alkali metal chlorate solution, such as a portion of the electrolytic cell alkali metal chlorate aqueous feed, to reduce the amount of chloric and perchloric acid ultimately recycled to the ion exchange compartment of electrolytic cell 2. The rinse wash liquor containing the residual chloric and perchloric acid is preferably recycled back into generator 60 and is not shown. The recycle concentration of chloric acid in the alkali metal feed to the first ion exchange compartment of electrolytic cell 2 is preferably less than about 2 normal, and more preferably less than 1 normal, and most preferably less than 0.5 normal. High concentrations of residual chloric and perchloric acid in the feed to the electrolytic cell will lower the electrolytic cell current efficiency in terms of alkali metal ion removal efficiency in direct proportion with the chloric and perchloric acid strength.

The preferably washed alkali metal chlorate/perchlorate precipitate then enters alkali metal chlorate feed dissolving tank 54 by line 53. Dissolving tank 54 has a crystal alkali metal addition point, such as commercial grade sodium chlorate crystal, as well as a deionized water feed point for solution preparation and steam or other heating source to prepare a concentrated alkali metal chlorate solution. The dissolving tank 54 also has an optional sodium perchlorate addition point. The dissolving tank includes means for mixing and agitating as well as for filtering the solution, making it suitable as a feed into a first ion exchange compartment 5 of electrolytic cell 2 by line 55.

Electrolytic cell 2 shows a recirculating anolyte stream having water and sulfuric acid addition as required. Anolyte effluent can be recovered from the gas disengager from excess solution volume additions to the anolyte. Anolyte gas is separated in the anolyte gas disengager. The catholyte stream of electrolytic cell 2 also shows one embodiment with a recirculating catholyte, such as NaOH with water addition to dilute the alkali metal hydroxide produced. The catholyte gas is separated in the catholyte gas disengager.

DETAILED DESCRIPTION OF THE INVENTION

When generating chlorine dioxide from solutions containing chloric acid, high acidity and high chlorate concentrations in the generating zone can cause the formation of perchlorate ions by the following reaction:

$$3HClO_3 \rightarrow 2ClO_2 + HClO_4 + H_2O$$

Perchlorate ions so formed represent an inefficiency in the overall reaction because they do not form chlorine dioxide. Additionally, it is theorized that reduction of perchlorate by methanol may lead to the formation of chlorine, an undesired impurity in chlorine dioxide. It has been surprisingly found that the use of externally added loads of perchlorate ions suppresses the rate of these undesired by product reactions thereby increasing the efficiency of the chlorine dioxide generating reaction. Accordingly, the present invention employs an abundance of externally added perchlorate ions to suppress the rate of oxidation of chlorate ions to perchlorate.

Perchlorate ions can be added to the generating zone in any suitable form. One preferred form is as perchloric acid. The use of perchloric acid can serve the dual purpose of increasing the total acidity of the generating zone at the same time as suppressing undesirable by product reactions. Perchloric acid can be fed to the generating zone separately or in combination with the other reactants used in generating chlorine dioxide.

The perchloric acid can be of any suitable concentration which will result in a ratio of perchlorate to chlorate ions of from about 1:10 to about 50:1. The addition and use of other acids to promote the reduction of the chlorate ions is ordinarily not required when the perchloric and chloric acid in the generating zone is in sufficient concentration to provide the acidity necessary for chlorine dioxide generation with the addition of a reducing agent. Therefore in a preferred embodiment of the invention sufficient perchloric acid will be added to the generating zone to achieve a total acid normality sufficient to produce chlorine dioxide without the use of an acid other than perchloric or chloric acid.

Any suitable reducing agents can be used in the generating zone. Inorganic reducing agents are the preferred class of reducing agents for use in this invention. Typical inorganic reducing agents are acids such as aqueous hydrochloric acid and gases such as carbon monoxide and anhydrous HCl. Other suitable inorganic reducing agents are peroxides such as hydrogen peroxide and alkali metal peroxides such as sodium peroxide and potassium peroxide.

Suitable organic reducing agents are alcohols such as ethanol, propanol, isopropanol, methanol, and higher molecular weight linear and branched alcohols. Other suitable organic reducing agents are carbohydrate sugars such as glucose, sucrose, maltose, and others. An additional group of organic reducing agents are water soluble carboxylic acids such as formic acid, oxalic acid, lactic acid and their corresponding alkali metal salts such as sodium formate, sodium oxalate, sodium lactate. A further group of organic reducing agents are glycols such as ethylene and propylene glycol. Still another group of suitable organic reducing agents are the aldehydes such as formaldehyde. Since organic reducing agents with perchloric acid can form chlorine gas in a side reaction, they are not the preferred class of reducing agents.

Reducing agents which form persistent anions are unsatisfactory for use in the claimed invention. Such agents include compounds of sulfur, including sulfur dioxide, sodium thiosulfate, sodium polysulfide, sulfur, thionyl chloride, sulfonyl chloride, organic sulfonates, sulfates, and mercaptans. These reducing agents form non volatile sulfate ions when they react with chloric acid or chlorate ions. The sulfate ions persist in the generator and also enter the electrolytic cell. Sulfate ions can reduce the rate of chlorine dioxide generation by buffering or kinetically inhibiting the concentration of available hydrogen ions in the $HClO_3/HClO_4/NaClO_3/NaClO_4$ mixture in the generator solution.

Suitable organic reducing agents such as ethylene glycol, carbohydrate sugars, methanol and other alcohols oxidize to form carbon dioxide which exits the generator with the chlorine dioxide and so do not form persistent anions. During the oxidation of methanol, formic acid is produced as an intermediate prior to being fully oxidized to carbon dioxide. Formic acid may be present as formate ion, but is eventually oxidized and is therefore not persistent.

The most preferred reducing agents are those that do not produce significant amounts of chlorine in the chlorine dioxide product. One of the most preferred is hydrogen peroxide.

When a $HClO_3/HClO_4/NaClO_3/NaClO_4$ mixture is used to produce chlorine dioxide, it is preferred that the total acid normality in the generator solution be about 0.5 normal or greater, and preferably 1.0 normal or greater. Solutions of these acid normalities can be produced directly by passing a solution of sodium chlorate and sodium perchlorate through the electrochemical cell. However, it may be desirable to concentrate the $HClO_3/HClO_4$ in the product solutions after removal from the cell and separate any crystals of the alkali metal chlorate/perchlorate salts that may be formed during the concentration.

The product solutions may be concentrated, for example, by evaporation at sub-atmospheric pressures and temperatures of less than about 100° C. Temperatures, for example, in the range of from about 30° to about 90° C., and preferably, from about 50° to 80° C. Solutions containing the desired acid normality may be produced in this manner.

Freeze concentration may be used to separate sodium chlorate and sodium perchlorate crystals from the chloric and perchloric acid solution and thus concentrate the remaining acid simultaneously. As the solution of chloric acid, perchloric acid, sodium chlorate and sodium perchlorate, is chilled, ice and sodium chlorate will crystallize simultaneously and in separate phases. The solution phase will be enriched in chloric acid and reduced in water content until an eutectic point is reached, at which chloric acid hydrate also crystallizes. During the practice of freeze concentration, it is also possible to recycle the melted ice along with the sodium chlorate and sodium perchlorate which dissolves as the ice melts for the purpose of preparing additional sodium chlorate and sodium perchlorate solution for feed to the electrolytic cell in the process of this invention.

An alternative embodiment includes a combination of freeze concentration followed by vacuum evaporation to concentrate the chloric and perchloric acid.

The continuous chlorine dioxide generation process permits co-production of valuable by-products, for example, an alkali metal hydroxide solution such as sodium hydroxide. Further, the process reduces operating costs by eliminating process steps and equipment from processes presently commercially available.

During generator operation, the temperature and pressure are related to the boiling point of the solution. The operating temperature of the generator should be in the range of from about 30° to 120° C., preferably in the range from about 35° to 110° C. and more preferably in the range of 40° to 100° C. at pressures preferably below atmospheric, in the range of about 30 to 500 mm Hg. Generator operation above atmospheric is also possible by any suitable method that insures that the gaseous chlorine dioxide in the generator does not exceed explosive concentrations. The rate of heat addition to the generator can be sufficient to remove water vapor from the generator at about the same rate that water is added to the generator. This water vapor can also serve to dilute the chlorine dioxide to a partial pressure of less than about 70 mm Hg.

The chlorine dioxide generator can be operated to precipitate alkali metal chlorate/sodium perchlorate at about the same rate as it is added with the feed. In this instance, the generator is operated as a generator/crystallizer. Preferably the salt is precipitated as $NaClO_3$, since $NaClO_4$ is more soluble than $NaClO_3$ and the perchlorate can increase the efficiency of the generator and cell when in solution.

Once precipitated the salt can be removed from the generating zone and separated from the mother liquor. The salt will comprise $NaClO_3$ with some mother liquor containing $HClO_3$ and $HClO_4$. In a preferred mode the salt will be dissolved with fresh $NaClO_3$ and recycled to the electrolysis zone. In this type of generating system, the electrochemical cell can be operated to feed the alkali metal chlorate and perchlorate solution to the generating zone from the ion exchange compartment of the cell.

Figure 4:
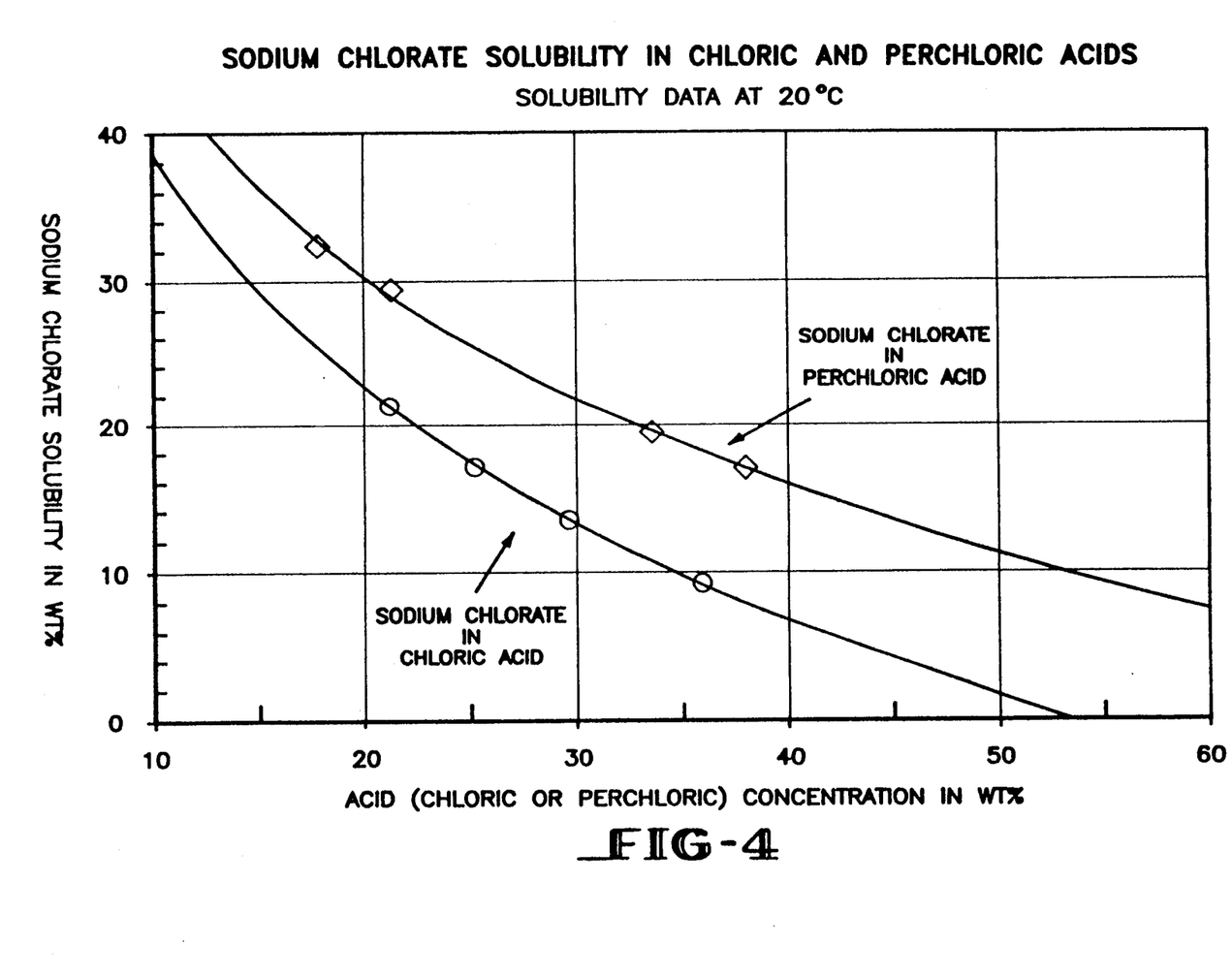
FIG. 4 is a graph plotting the solubility of sodium chlorate in chloric acid and perchloric acid.

In a preferred mode of the invention the solution leaving the anode compartment will have equimolar ratios of total acid to total chlorate and perchlorate. The feed from the electrolytic cell to the generator is preferably saturated in alkali metal chlorate, particularly sodium chlorate, and preferably heated to increase solubility to about 45 wt % or greater, more preferably 48 wt % or greater. The ratio of chloric acid to chlorate ion in the electrolytic cell feed to the chlorine dioxide generator is preferred to be 0.5:1 to 1:1 or greater. The presence of perchlorate ions significantly affects the solubility of sodium chlorate as indicated in FIG. 4.

Alkali metal chlorate precipitation in the generator depends on the solubility of the alkali metal chlorate salt in the chloric acid/perchloric acid solution mixture in the generator. The salt solubility is highly dependent both on temperature and the total acid concentration.

If the generator is operated without precipitation of alkali metal chlorate, chlorine dioxide production can be increased. Most of this increase is due to the greater generator volume resulting from the lack of solid salts in the generating zone. Generator volume that would be filled by chlorate salt can be used for chlorine dioxide generation.

When the generator is operated without precipitation of chlorate salt, some of the spent generator solution containing alkali metal chlorate, chloric acid and perchloric acid can be recycled to control the precipitation of alkali metal salt.

Recycling the spent generator solution can be accomplished using a variety of different methods. One method involves feeding the spent generator solution into the ion exchange compartment of the cell with the alkali metal chlorate feed solution being acidified. The solution leaving the ion exchange compartment is then fed to the anode compartment. From the anode compartment the solution is recycled to the generating zone. This method is the most preferred as it results in a high faradic current efficiency.

A second method involves feeding the spent generator solution to the anode compartment of the cell, while feeding an alkali metal chlorate solution to the ion exchange compartment. Using this method, sodium ions and a lesser quantity of hydrogen ions in the spent generator solution will be transported into the ion exchange compartment. This has the overall net effect of increasing the sodium based current efficiency of the cell. One drawback of this method is that some anodic oxidation of alkali metal chlorate and chloric acid to form perchloric acid occurs, but this formation reaction is reduced because of the presence of perchlorate ions in the anolyte. When fed from the anode compartment to the generating zone perchloric acid will not form chlorine dioxide and therefore is an inefficiency of the reaction.

Spent generator solution can also be fed to the ion exchange compartment with the alkali metal chlorate solution being acidified. This method is not as preferred because hydrogen ions in the spent generator solution compete with alkali metal ions by migrating to the cathode compartment to combine with hydroxide ions to form water. This represents an inefficiency in the system.

In a further alternative embodiment, the combined electrolysis zone and the chlorine dioxide generator can be operated continuously without alkali metal chlorate/sodium perchlorate precipitation in the generator by employing a smaller second precipitating vessel and removing some generator recirculating liquor, precipitating an alkali metal salt from the liquor, separating an alkali metal chlorate/sodium perchlorate precipitate from the liquor, recycling the mother liquor back to the generator, and recycling the alkali metal chlorate precipitate to the electrolytic cell alkali metal feed system. The precipitation process can employ the evaporation or freezing methods disclosed in this application. The amount of alkali metal precipitate removed would be balanced with alkali metal chlorate consumption during chlorine dioxide generation. Sufficient water would be retained in the generator to keep alkali metal chlorate/sodium perchlorate in solution in the generator. Some of the advantages with this process are that the chlorine dioxide production is increased because there is a generator operating volume increase because there is no precipitate in the liquor taking up volume. This process would require more capital equipment and have a higher operating cost, but this is offset by the increase in chlorine dioxide production capacity.

As one aspect of the process of generating chlorine dioxide, alkali metal chlorate is converted to chloric acid in an electrolytic cell. Two sources of inefficiency in this reaction are (1) the production of perchlorates if a part of the alkali metal chlorate solution is passed through the electrolytic cell anode compartment and (2) $H^+$ ion transport into the cathode compartment. Both of these sources of inefficiency are effected by the addition of perchlorate ions into the cell. When alkali metal chlorate is fed through the electrolysis zone and a portion of the chlorate is converted to chloric acid in the anolyte compartment a competing reaction involving the formation of perchlorate ions is also occurring. In this competing reaction, alkali metal chlorate is oxidized to form perchlorate ions. This reaction is a source of inefficiency in that perchlorates so formed will not be capable of reduction in the chlorine dioxide generating zone to form chlorine dioxide. For every mole of perchlorate ions so formed, one less mole of chlorine dioxide can potentially be formed.

Another source of inefficiency relates to the transport of $H^+$ ions into the cathode compartment of the cell. Hydrogen ions that migrate into the cathode compartment represent a Faraday inefficiency because these ions did not displace sodium ions and thus raise the acid content of the sodium chlorate solution. In a preferred embodiment of the claimed invention, cation permeable exchange membranes are employed to separate the anode and cathode compartments if a two compartment cell, and the cathode and ion exchange compartments in a three or more compartment cell. Both hydrogen ions and sodium ions have an equal ability to traverse an ion exchange membrane that is non-selective to $H^+$ or $Na^+$ ions separating the cathode compartment from the adjoining compartment. The ratio at which the sodium and hydrogen ions transport through the membrane into the cathode compartment is therefore determined by their respective concentrations. The molar ratio $[Na^+]/[H^+]$ will therefore be proportional to the sodium based current efficiency of the cell. The higher the concentration of sodium ions to the concentration of hydrogen ions in the solution adjacent to the cathode membrane the more efficient the cell will be.

Applicants method of adding an external load of sodium perchlorate accomplishes this goal. The solubility of sodium chlorate is about 55.6 wt. % at 50° C. and increases with temperature. Sodium perchlorate is more soluble with a solubility of 73.2 wt. % at 50° C. When a load of perchlorate is added to the alkali metal chlorate solution, the load of perchlorate will increase the sodium ions in the solution, thereby increasing the $[Na^+]/[H^+]$ concentration resulting in an increased operating current efficiency of the cell. The perchlorate that is added to the solution can be in any form whatsoever.

An alternative way to add perchlorate ions to the chlorine dioxide generating system is to add sodium perchlorate to the solution being fed to the electrolytic cell. When added in this manner the sodium perchlorate travels through the cell where a portion of it is converted to perchloric acid. The solution leaving the cell and being fed to the generating zone will therefore contain perchloric acid and sodium perchlorate in addition to chloric acid and sodium chlorate.

The externally added sodium perchlorate can be added to the generator in any suitable form such as crystals or as an aqueous solution. Such an aqueous solution may be formed by dissolving substantially pure sodium perchlorate in pure or deionized water. The preferred mode is to add the sodium perchlorate as crystals.

When sodium perchlorate is used it can be added to the system between the generating zone and the electrolysis zone. One preferred was of adding the sodium perchlorate is to add it to a dissolving tank which feeds the electrolysis zone. Sodium chlorate can also be added to this dissolving tank to replace chlorate ions converted to chlorine dioxide in the generating zone. When added in this manner sodium Perchlorate will pass through the electrolysis zone and be converted to perchloric acid. Thus when perchlorate ions are added to the system in this manner the feed to the generating zone will contain perchloric acid and sodium perchlorate in addition to chloric acid and sodium chlorate. Under steady state, continuous-operation conditions the total amount or perchlorate ions in the system will remain substantially constant and hence exist as an inert load in the system. In this manner the amount of sodium perchlorate in the system will remain substantially constant.

The amount of sodium perchlorate added to the system can be varied widely. A preferred amount will result in a ratio of perchlorate ions to chlorate ions of from about 1:10 to about 50:1. In the instance where sodium perchlorate is converted into perchloric acid, the perchloric acid remains in the generating system and contributes to the total acidity in the generating zone. When used with a crystallizing generator, sodium perchlorate may be partially crystallized with sodium chlorate crystals in the generator and then recycled to the electrolytic cell. If there is an accumulation of perchlorate ions in excess of the amount desired, then addition of an organic reducing agent can be used to adjust the concentration of perchlorate ions.

When the system is operated by adding perchlorate ions as sodium perchlorate the $HClO_3/HClO_3/HClO_4/NaClO_3/NaClO_4$ feed into the generating zone is produced in an electrolytic cell as follows.

An aqueous solution of an alkali metal chlorate and sodium perchlorate is fed to the single or multiple ion exchange compartments of the electrolytic cell. Suitable alkali metal chlorates include sodium chlorate, potassium chlorate and lithium chlorate. In order to simplify the disclosure, the process of the invention will be described using sodium chlorate, which is a preferred embodiment of the alkali metal chlorates. As shown in FIG. 3, the alkali metal chlorate feed solution may be prepared, for example, by dissolving a crystalline alkali metal chlorate, such as sodium chlorate, in pure or deionized water. Commercial sodium chlorate is suitable as it has a low sodium chloride content and the formation of undesirable amounts of chlorine dioxide in the electrolytic cell is prevented. Similarly a sodium perchlorate feed solution may be prepared, for example, by dissolving crystalline sodium perchlorate in pure or deionized water.

Aqueous alkali metal chlorate feed solutions which may be employed contain any suitable concentrations of alkali metal chlorate (e.g., sodium chlorate) up to about saturation at the temperatures at which the solutions are fed to the ion exchange compartment of the electrolytic cell. For purposes of illustration, sodium chlorate will be used as an example of an alkali metal chlorate. Sodium chlorate solutions having a concentration in the range of from about 0.1% by weight to those saturated with sodium chlorate at temperatures in the range from about 0° C. to about 100° C., and preferably from about 15° C. to about 80° C. Sodium chlorate solutions having a concentration in the range from about 0.1% by weight to about 60% by weight of $NaClO_3$, preferably from about 20% to about 55%, and more preferably from about 30% to about 50% by weight of $NaClO_3$ are also suitable.

The process of the invention utilizes an electrochemical cell to generate hydrogen ions that displace or replace a portion of the sodium ions present in the aqueous sodium chlorate solution feed stream.

The generation of hydrogen ions in the process of the present invention in the anode compartment is accompanied by the oxidation of water at the anode into oxygen gas and $H^+$ ions by the electrode reaction as follows:

$$2H_2O \rightarrow O_2 + 4H^+ + 4e^-$$

The anode compartment contains an anolyte, which can be an aqueous solution of any non-oxidizable acid which is suitable for conducting hydrogen ions into the ion exchange compartment. Non-oxidizable acids which may be used include sulfuric acid, phosphoric acid, perchloric acid and the like. Where a non-oxidizable acid solution is used as the anolyte. The concentration of the anolyte is preferably selected to match the osmotic concentration characteristics of the alkali metal chlorate solution fed to the ion exchange compartment in order to minimize water exchange between the anode compartment and the ion exchange compartment. Additionally, a solution of hydrochloric acid or a mixture of HCl and an alkali metal chloride can be used as the anolyte. This results in the generation of chlorine gas at the anode. Where a chlorine generating anolyte is employed, it is necessary to select a cation exchange membrane as the separator between the anode compartment and the ion exchange compartment which is stable to chlorine gas. The anode compartment may also employ a strong acid cation exchange resin and an aqueous solution such as deionized water as the anolyte.

Any suitable anode may be employed in the anode compartment, including those which are available commercially as dimensionally stable anodes. Preferably, an anode is selected which will generate oxygen gas.

Suitable anodes include porous or high surface area anodes. The anodes may be constructed of materials such as metals including platinum, gold, palladium, or mixtures or alloys thereof, or thin coatings of such materials on various substrates such as valve metals, i.e., titanium, can also be employed. Additionally oxides of iridium, rhodium or ruthenium, and alloys and their mixtures with other platinum group or precious metals can be employed. Commercially available oxygen evolution anodes of this type include those manufactured by Englehard (PMCA 1500) or Eltech (TIR-2000). Other suitable anode materials include graphite, graphite felt, a multiple layered graphite cloth, a graphite cloth weave, carbon, ceramic oxide based anode materials such as Ebonex or pyrovskite-type compounds, and the like.

The hydrogen ions generated in the anode compartment pass through the cation exchange membrane into the sodium chlorate sodium/perchlorate solution in the ion exchange compartment. As a hydrogen ion enters the solution, a sodium ion is displaced and by electrical ion mass action passes through the cation membrane adjacent to the cathode compartment to maintain electrical neutrality.

The electrolytic process of the invention as operated results in the conversion of sodium chlorate to chloric acid over a wide range, for example, from about 1% to about 99.9%, preferably from about 5% to about 95%, and more preferably from about 15% to about 90%.

The sodium chlorate/sodium perchlorate feed solution concentration, the residence time in the ion exchange compartment as well as the cell amperage are factors that affect the extent of the conversion of sodium chlorate to chloric acid and sodium perchlorate to perchloric acid.

Using very dilute solutions of sodium chlorate, high percentages of conversion of $NaClO_3$ to chloric acid can be achieved, i.e., up to 99.9%. For a single pass flow through system, typical residence times in the ion exchange compartment are between about 0.1 to about 120 minutes, with a more preferred range of about 0.5 to about 60 minutes.

The electrolytic part of the present invention is operated at a current density of from about 0.01 $KA/m^2$ to about 10 $KA/m^2$, with a more preferred range of about 0.05 $KA/m^2$ to about 4 $KA/m^2$.

Current efficiencies during operation of the process of the invention can be increased by employing additional ion exchange compartments, as illustrated by FIG. 2, which are adjacent and operated in a series flow pattern.

Adjusting the width of the ion exchange compartment can also alter the operating cell voltage and current efficiency. The width, or space between the cation exchange membranes forming the walls of the ion exchange compartment, is in the range of from about 0.1 to about 10, and preferably from about 0.3 to about 5 centimeters.

In an alternate embodiment the ion exchange compartment contains a cation exchange medium. Cation exchange mediums which can be used in the ion exchange compartment include cation exchange resins. Suitable cation exchange resins include those having substrates and backbones of polystyrene based with divinyl benzene, cellulose based, fluorocarbon based, synthetic polymeric types and the like. Where more than one ion exchange compartment is employed, inclusion of the cation exchange medium is optional for each compartment.

Functional cationic groups on these mediums include carboxylic acid, sulfonic or sulfuric acids, and acids of phosphorus such as phosphonous, phosphonic or phosphoric. The cation exchange resins are suitably ionically conductive so that an effective amount of current can be passed between the cation exchange membranes uses as separators. Various percentage mixtures of resins in the hydrogen form and the sodium form may be used in various sections of the ion exchange compartments on assembly to compensate for the swelling and contraction of resins during cell operation. For example, percentage ratios of hydrogen form to sodium form may include those from 50% to 100%.

The use of cation exchange resins in the ion exchange compartment can serve as an active mediator which can exchange or absorb sodium ions and release hydrogen ions. The hydrogen ions generated at the anode thus regenerate the resin to the hydrogen form. Sodium ions are released and pass into the cathode compartment. Cation exchange resins are particularly beneficial when feeding dilute sodium chlorate solutions as they help reduce the cell voltage and increase conversion efficiency.

Preferred as cation exchange mediums are strong acid type cation exchange resins in the hydrogen form as exemplified by low cross-linked resins such as AMBERLITE® IRC-118 (Rohm and Haas Co.) as well as higher cross-linked resins i.e. AMBERLITE® IRC-120. High surface area macro-reticular or microporous type ion exchange resins having sufficient ionic conductivity in the ion exchange compartments are also suitable.

Physical forms of the cation exchange resin are those which can be packed into compartments and include beads, rods, fibers or a cast form with internal flow channels. Bead forms of the resin are preferred.

Cation exchange membranes selected as separators between compartments are those which are inert membranes, and are substantially impervious to the hydrodynamic flow of the alkali metal chlorate solution or the electrolytes and the passage of any gas products produced in the anode or cathode compartments.

Cation exchange membranes are well-known to contain fixed anionic groups that permit intrusion and exchange of cations, and exclude anions from an external source. Generally the resinous membrane or diaphragm has as a matrix, a cross-linked polymer, to which are attached charged radicals such as $-SO_3^-$ and/or mixtures thereof with $-COOH^-$. The resins which can be used to produce the membranes include, for example, fluorocarbons, vinyl compounds, polyolefins, hydrocarbons, and copolymers thereof. Preferred are cation exchange membranes that comprise fluorocarbon polymers or vinyl compounds such as divinyl benzene having a plurality of pendant sulfonic acid groups or carboxylic acid groups or mixtures of sulfonic acid groups and carboxylic acid groups. The terms "sulfonic acid group" and "carboxylic acid groups" are meant to include salts of sulfonic acid or salts of carboxylic acid groups formed by Processes such as hydrolysis. Ceramic based membranes are also suitable. Ceramic based membranes can be based on $ZrO_2$, $SiO_2$ and other inorganic oxides. Preferred are those membranes which are chemically resistant to $HClO_3$, $HClO_4$, other acids and alkalis such as NaOH.

Preferred cation exchange membranes are those which exclude chlorate ions efficiently and thus prevent the intrusion of chlorate ions into the anode or cathode compartments. Chlorate ion intrusion may be measured as the ratio of moles of chlorate ion migration to the faradays of current passed. This ratio defines a transference number for chlorate ion. The most preferred membranes have chlorate transference numbers of less than about 0.01.

Suitable cation exchange membranes are readily available, being sold commercially, for example, by Ionics, Inc., by Sybron Corp., by E.I. DuPont de Nemours & Co., Inc., under the trademark "NAFION®", by the Asahi Chemical Company under the trademark "ACIPLEX®", and by Tokuyama Soda Co., under the trademark "NEOSEPTA®". Among these are the perfluorinated sulfonic acid type membranes which are resistant to oxidation and high temperatures such as DuPont NAFION® types 117, 417, 423, etc., membranes from the assignee of U.S. Pat. No. 4,470,888, and other polytetrafluorethylene based membranes with sulfonic acid groupings such as those sold under the RAIPORE® tradename by RAI Research Corporation.

The catholyte can be any suitable aqueous solution, including alkali metal chlorides, and any appropriate acids such as hydrochloric, sulfuric, phosphoric, nitric, acetic or others.

In a preferred embodiment, deionized or softened water or sodium hydroxide solution is used as the catholyte in the cathode compartment to produce an alkali metal hydroxide by-product. The water selection is dependent on the desired purity of the alkali metal hydroxide by-product. The cathode compartment may also contain a strong acid cation exchange resin in a cation form such as sodium as the electrolyte.

Any suitable cathode which generates hydrogen gas may be used, including those, for example, based on nickel or its alloys, including nickel-chrome based alloys; steel, including stainless steel types 304, 316, 310, etc.; graphite, graphite felt, a multiple layered graphite cloth, a graphite cloth weave, carbon; and titanium or other valve metals as well as valve metals having coatings which can reduce the hydrogen overvoltage of the cathode. The cathode is preferably perforated to allow suitable release of the hydrogen gas bubbles produced at the cathode particularly where the cathode is placed against the membrane.

Optionally a porous spacer material such as a chemically resistant non-conductive plastic mesh or a conductive material like graphite felt can be positioned behind the anode and/or the cathode to support the electrodes. This would permit adjustment of the gap between the electrode and the cation permeable ion exchange membrane, in the case, for example, when using high open area expanded metal electrodes. The porous spacer material preferably has large holes for ease of disengagement of the gases from the anolyte and/or catholyte. A thin protective spacer can also be placed between the anode and/or the cathode and the cation permeable ion exchange membranes. This spacer can be a non-conductive plastic or a porous conductive material like graphite felt. The cell may be operated with the electrode in contact with the thin protective spacer and the porous spacer material, or with the membrane in direct contact with the electrode and with or without the porous spacer material.

It will be recognized that other configurations of the electrolytic cell can be employed in the process of the present invention, including bipolar cells utilizing a solid plate type anode/cathode or bipolar membranes. For example, a bipolar electrode could include a valve metal such as titanium or niobium sheet clad to stainless steel. The valve metal side could be coated with an oxygen evaluation catalyst and would serve as the anode.

An alternative anode/cathode combination which is commercially available is a platinum clad layer on stainless steel or niobium or titanium and is prepared by heat/pressure bonding.

The product solution from the electrolytic cell contains chloric and perchloric acid and alkali metal chlorate in a wide range of concentrations and ratios of chloric acid to alkali metal chlorate. For example, the solutions produced can provide molar ratios of chloric acid to alkali metal chlorate of from about 0.1:1 to about 250:1. Where the product solutions are to be used for known commercial process for the generation of chlorine dioxide, suitable molar ratios of chloric acid to alkali metal chlorate of from about 0.3:1 to about 200:1, and preferably from about 1:1 to about 100:1.

These solutions are highly acidic. These solutions can be used without requiring additional acids, or where additional acids are wanted or required, permit a reduction in the amount of acid employed in the generation of chlorine dioxide.

In a preferred mode of this invention, the rate at which sodium chlorate/sodium perchlorate solution is passed through the electrolysis zone is sufficient to remove heat from the cell so that no cooling of the cell is required. The electrolytic process always produces some waste heat. Higher cell voltage or lower current efficiency will increase the waste heat produced per unit of chloric acid formed. In the most optimum case, the heat from electrolysis is exactly sufficient to operate the generator. This enables the integrated process to be designed without any additional heat exchange equipment.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A process for producing chlorine dioxide which comprises:
   a) feeding perchlorate ions into a chlorine dioxide generating zone;
   b) feeding a reducing agent having non-persistent anions into the chlorine dioxide generating zone;
   c) feeding an aqueous solution of chloric acid, perchloric acid, alkali metal chlorate and alkali metal perchlorate into the chlorine dioxide generating zone;
   d) reducing said chloric acid with said reducing agent in the presence of said perchlorate ions in the chlorine dioxide generating zone to form a gaseous phase comprising chlorine dioxide and water vapor and a liquid phase comprising an aqueous slurry of chloric acid, perchloric acid, alkali metal chlorate, alkali metal perchlorate, and an alkali metal chlorate/alkali metal perchlorate precipitate, the amount of perchlorate ions present in the generation zone during said reduction being sufficient to suppress the formation of chlorine;
   e) separating said gas phase from said liquid phase;
   f) separating the alkali metal chlorate/alkali metal perchlorate precipitate from an aqueous solution of chloric acid, perchloric acid, alkali metal chlorate, and alkali metal perchlorate;
   g) recycling said aqueous solution of chloric acid, perchloric acid, alkali metal chlorate, and alkali metal perchlorate back to the chlorine dioxide generating zone;
   h) dissolving said alkali metal chlorate/alkali metal perchlorate precipitate into an aqueous solution of alkali metal chlorate to form an aqueous feed solution of alkali metal chlorate and alkali metal perchlorate;
   i) feeding said aqueous feed solution into an electrolytic cell;
   j) electrolyzing said aqueous feed solution in said electrolytic cell to produce an aqueous solution of chloric acid, perchloric acid, alkali metal chlorate and alkali metal perchlorate which is then used as a feed solution for step (c) above.

2. A process of claim 1 which comprises reducing chloric acid with reducing agent selected from the group consisting of hydrogen peroxide, alkali metal peroxides, organic peroxides, methanol, ethylene glycol, and sugars.

3. A process of claim 2 wherein said reducing agent is hydrogen peroxide.

4. A process of claim 1 which comprises reducing chloric acid with a reducing agent that does not react with perchlorate ions.

5. The process of claim 1 wherein said reducing step (d) is carried out at a temperature of from about 30° C. to about 120° C.

6. The process of claim 5 which comprises maintaining a pressure of from about 30 mm Hg to about 500 mm Hg in step (d).

7. The process of claim 1 wherein the total acid normality of the generator solution during said reducing step (d) is 0.5 normal or greater.

8. The process of claim 7 wherein the total acid normality of the generator solution during said reducing step (d) is 1.0 normal or greater.

9. The process of claim 1 wherein the aqueous solution of chloric acid, perchloric acid, alkali metal chlorate, and alkali metal perchlorate produced in step (j) is concentrated and any crystals of alkali metal chlorate/alkali metal perchlorate formed during said concentration are removed before being used as a feed solution for step (c).

10. The process of claim 9 wherein said concentration is carried out by evaporation at sub-atmospheric pressures and at temperatures below above 100° C.

11. The process of claim 9 wherein said concentration is freeze concentration.

12. The process of claim 1 wherein said electrolytic cell is a three compartment electrolytic cell having an anode compartment, a cathode compartment, and at least one ion exchange compartment located between said anode compartment and cathode compartment.

13. A process of claim 12 wherein steps (i) and (j) further comprise feeding said aqueous feed solution through a first ion exchange compartment to acidify the aqueous alkali metal chlorate and alkali metal perchlorate solution.

14. A process of claim 12 wherein steps (i) and (j) further comprise feeding said aqueous feed solution through a first ion exchange compartment to acidify the feed solution, removing the acidified aqueous feed solution from said first ion exchange compartment and feeding it into a second ion exchange compartment to further acidify said aqueous feed solution.

15. A process of claim 12 wherein steps (i) and (j) further comprise feeding said aqueous feed solution through an ion exchange compartment to acidify the aqueous feed solution, removing acidified aqueous feed solution from said ion exchange compartment and feeding said acidified aqueous feed solution to said anode compartment for further acidification.

16. A process of claim 1 wherein said alkali metal is sodium.

17. The process of claim 1 wherein additional alkali metal perchlorate is added to the alkali metal chlorate-/alkali metal perchlorate precipitate or aqueous feed solution after step (f) and before step (i).

18. The process of claim 1 wherein the perchlorate ions in step (d) are added as perchloric acid.

* * * * *